Oct. 5, 1926.
T. J. TOPPER
1,601,987
COFFEE CONTAINER FOR URNS
Filed Dec. 14, 1925
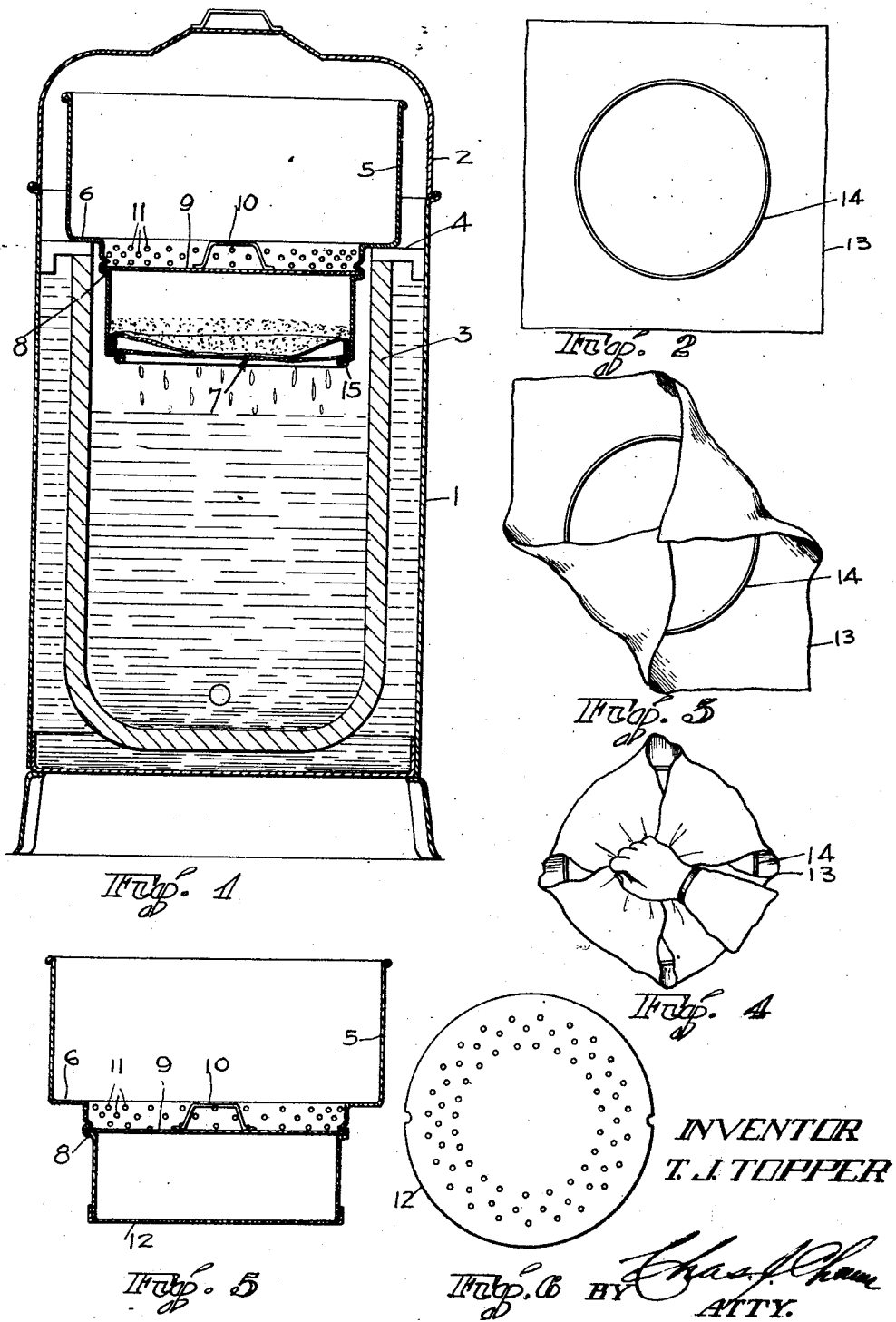

Patented Oct. 5, 1926.

1,601,987

UNITED STATES PATENT OFFICE.

THOMAS J. TOPPER, OF SAN FRANCISCO, CALIFORNIA.

COFFEE CONTAINER FOR URNS.

Application filed December 14, 1925. Serial No. 75,184.

This invention relates to improvements in coffee urns and more particularly to containers or "bags" for holding the coffee in proper relation to the vessel in which the coffee is to be brewed.

One of the purposes of the invention is to provide a coffee container of the character described which is simple as to construction, inexpensive, easy to handle as in placing, removing and cleaning it and which will support the coffee above the level of the brew.

Another object of the invention is to provide a container of the character described which is constructed so that it will not overflow when large quantities of water are poured into the container, there being an especially arranged series of outlet openings and a perforated lid, which latter maintains the coffee grounds below the plane of the openings and permits of an escape of water which rises above the level of the lid into the brewing vessel and thereby prevents overflowing of the coffee container and eliminates the objectionable conditions which would otherwise occur.

It frequently happens in brewing coffee in large urns that the operator pours a greater amount of water into the coffee container than will seep through the coffee and container into the urn. Under these conditions the water will rise in the coffee container and overflow the latter thereby producing an objectionable condition in and around the urn. The present type of container as above explained, eliminates this objection in that it provides for escape of the water from a point well below the top of the container into the crock as soon as the level of the water rises above the perforated lid which confines the coffee to the lower part of the container therefor.

Another purpose of the invention is to provide a novel form of foraminous bottom or screen for the bottom of the coffee container, which bottom comprises a suitable piece of cloth, preferably of a rectilinear form, associated with a band or ring in such manner that the cloth bottom may be easily and conveniently placed in position and removed.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing:

Fig. 1 represents a vertical sectional view of a coffee urn containing the coffee container of my invention as it would appear when in use.

Fig. 2 represents a top plan view of the foraminous bottom or screen device before assembly thereof.

Fig. 3 represents a top plan view of the device shown in Fig. 2 as when partly assembled.

Fig. 4 represents a top plan view of the screen bottom as when assembled and ready for being mounted in or removed from the container.

Fig. 5 represents a vertical sectional view of a modified form of container in which a foraminated metal bottom is employed instead of a removable cloth screen.

Fig. 6 represents a top plan view of the perforated metal bottom shown in Fig. 5.

The coffee container of this invention is used in connection with an urn such as shown in the accompanying drawing and comprises a main jacket 1, a lid or cover 2 for the upper end thereof and a coffee brewing vessel 3, known as a crock, there being an annular flange 4 which is disposed below the upper end of the jacket and extends over the upper edge of the crock.

The container consists of a cylindrical body 5 preferably formed of aluminum or some similar metal, which body is reduced at the lower portion thereof and thereby defines an annular shoulder 6 which rests upon the flange 4 in such manner that the reduced end of the body extends upwardly above the shoulder. The upper end of the container is open and the lower end is provided with a foraminous bottom generally designated 7. Below the shoulder 6 there is provided interiorly of the container, an annular shoulder 8 adapted to support a perforated lid 9 having a handle 10. In that portion of the cylindrical wall of the container between the shoulders 6 and 8, are a plurality of small openings 11. The coffee is placed in the container substantially to the level of the shoulder 8 and the lid is then mounted in place so as to rest upon said shoulder. When water is poured or otherwise placed within the container, it passes through the perforations or openings in the lid 9, comes in contact with the coffee, and escapes through the foraminous or screen bottom 7. It frequently happens that water is fed to the container faster than it will run or seep through the foraminous bottom 7 and it will then back up through the openings or perforations in the lid 10 and tend to fill up the upper part of the container. If it were not for the openings 11, the water would flow over the top of the container and produce an objectionable condition in and around the urn. However, the openings 11 permit the water which rises above the level of the lid 9 to escape from the container and drip into the crock. In this connection it will be noted that the offset lower end of the portion of the container is circumferentially spaced from the crock allowing free passage of the overflowing water into the crock. The lid 9 with its fine perforations prevents the coffee from passing upwardly with the water and tending to clog the openings 11 or otherwise produce an objectionable condition in the upper part of the container. The openings 11 therefore prevent overflowing of the coffee container and permits of a quick filling of the coffee container with the desired or larger amounts of water than has heretofore been possible. Thus, not only does the coffee container of this invention eliminate an objection which was heretofore present in coffee urns but also provides for a saving in time in the brewing of coffee.

The foraminous or screen bottom may comprise a perforated metal bottom made as shown at 12 in Figs. 5 and 6, or may comprise a rectilinear cloth sheet 13, and ring 14 as shown in Figs. 1 to 4 inclusive. In the latter instance, the bottom is of necessity removable, in order that the cloth may be cleaned and renewed. To facilitate the placing and removal of the screen bottom of this character, the construction of this bottom is of special form, and also the end of the container is preferably provided with an inwardly extending annular flange 15 for supporting this removable bottom. The cloth 13 is preferably of a coarse nature and is spread out flat with the ring on top of it as shown in Fig. 2 to prepare for assembling the bottom. The operator then brings the corners of the cloth so as to overlie one another on top of the ring as shown in Figs. 3 and 4 and having completed this operation, has the four corners in a position so that they serve somewhat as a handle and may be easily grasped as shown in Fig. 4 to provide for mounting the bottom in place. Otherwise, these corners are grasped to remove the cloth bottom.

The lid 9 is held in position upon the shoulder 8 by means of knobs 17 formed on the lower part of the container 5, which knobs are adapted to extend over the lid as shown in the drawing. In opposite sides of the lid are notches 18 through which the knobs extend in the fitting of the lid in place, after which the lid is turned to bring the notches out of registration with the knobs.

I claim:

1. A coffee container for urns comprising a body portion terminating in a reduced lower end thereby defining an annular shoulder between the ends of the container, a foraminous bottom at the lower end of the container and a perforated lid removably mounted within the container above the level of the coffee placed in the container, said container having a plurality of water discharge openings in the side thereof located above said lid.

2. A coffee container for urns comprising a shell-like body portion open on its upper end, a foraminous bottom for the body portion, the said container being reduced at its lower end and thereby defining an annular shoulder between the upper and lower ends of the container whereby the reduced portion may extend into a vessel in which the coffee is to be brewed and a perforated lid removably mounted within the body portion and adapted to extend over the coffee placed in the container, said body having a discharge opening disposed above the plane of the lid and below the upper end of the container.

3. The combination with a coffee brewing vessel, of a container for coffee extending in part into said vessel, a foraminous bottom for the container adapted to support coffee placed within the container, said container having a discharge opening disposed well above the lower end thereof and located below the plane of the upper end of the vessel for causing water to flow from the container into the vessel and means between the coffee containing space of said container and said discharge opening for preventing coffee from raising to the plane of said discharge opening.

4. The combination with a coffee brewing vessel a coffee container having a part thereof extending into said brewing vessel, a foraminous bottom at the lower end of the container adapted to support a quantity of coffee placed in the container and a lid removably mounted within the container above the level of the coffee placed therein, said container having a discharge opening above the plane of the lid and arranged to discharge water directly into the vessel.

5. The combination with a vessel for brewing coffee, of a coffee container extending in part into said vessel, a foraminous bottom in the lower end of the container adapted to support coffee placed in the container, an annular shoulder disposed interiorly of the vessel, and a perforated lid removably mounted within the container and adapted to be supported upon said shoulder, said container having a plurality of outlet openings above said shoulder and in that portion of the container which extends into the vessel.

THOMAS J. TOPPER.